United States Patent
Mou

Patent Number: 5,923,474
Date of Patent: Jul. 13, 1999

[54] OPTICAL DEVICE HAVING REDUCED SIZE BY RELOCATING LENS AND REFLECTING MIRRORS THEREOF

[75] Inventor: Michael Mou, Tu-Cheng, Taiwan

[73] Assignee: DBTEL Incorporated, Taipei Hsien, Taiwan

[21] Appl. No.: 09/123,324

[22] Filed: Jul. 28, 1998

[51] Int. Cl.⁶ .............................. G02B 27/10; G02B 05/08
[52] U.S. Cl. ........................... 359/618; 359/851; 359/861
[58] Field of Search .................................... 359/618, 627, 359/850, 851, 856, 857, 861

[56] References Cited

U.S. PATENT DOCUMENTS

| | | | |
|---|---|---|---|
| 2,969,710 | 1/1961 | Zibritosky et al. | 356/32 |
| 5,033,821 | 7/1991 | Hama et al. | 359/889 |
| 5,777,736 | 7/1998 | Horton | 356/346 |

*Primary Examiner*—Georgia Epps
*Assistant Examiner*—Ricky Mack
*Attorney, Agent, or Firm*—Rosenberg, Klein & Bilker

[57] ABSTRACT

An optical device including a reflecting device, a focusing device and a processing device for realizing image data of a target object is disclosed. The focusing device is located within an enclosed area surrounded by a reflective light track so that the two light paths respectively from the target object to the focusing device through the reflecting device, and from the focusing device to the processing device are overlapped. By this way, the size of the optical device contributed by the distance between the reflective device and the processing device is reduced.

5 Claims, 2 Drawing Sheets

OPTICAL DEVICE HAVING REDUCED SIZE BY RELOCATING LENS AND REFLECTING MIRRORS THEREOF

FIELD OF THE INVENTION

The present invention is related to an optical device, and more particularly related to an optical device having different arrangement of focusing and reflecting means from the conventional devices in order to reduce the size of the optical device.

BACKGROUND OF THE INVENTION

For an operational principle of an optical device such as a scanner, light distances D and F respectively from a target object to a lens set and from the lens set to a photoelectric device of the optical device are both required to be constant. In view of a general design for reducing the size of an optical device, as shown in FIG. 1, a plurality of reflecting mirrors 11 are arranged between the target object 12 and the lens set 13. Light is transmitted from the target object 12 to the lens set 13 to be focused through the multiple reflections of the reflecting mirrors 11 with a light distance D equal to the distance of a+b+c+e, and then further transmitted to a photoelectric device 14 to be processed with another light distance F. By multiply reflecting light between the target object 12 and the lens set 13, the light distance D can be kept unchanged, and the distance between the target object 12 and the lens set 13 can be compacted from the distance D to a distance G much smaller than D. Accordingly, one of the dimensions of the optical device is reduced by at least a distance of (D+F)−(G+F).

In order to further reduce the size of an optical device, another kind of arrangement of reflecting mirrors is provided in another conventional optical device, as shown in FIG. 2. In this optical device, reflecting mirrors 211 and 212 allowing multiple reflections are used. Light is transmitted from the target object 22 to the lens set 23 to be focused through the multiple reflecting mirrors 211, 212 and 213 still with the constant light distance D which is equal to the distance of h+i+j+k+l+m in this case, and then further transmitted to a photoelectric device 24 to be processed with the constant light distance F. By this way, the light path is further compacted because of more reflections among the reflecting mirrors. The distance between the target object 12 and the lens set 13 is compacted from the distance G further to a distance N, and one of the dimensions of the optical device is accordingly further reduced by at least the distance of (G+F)−(N+F).

Although the size of an optical device can be reduced by the compact of the light path due to the arrangement of multiple reflecting mirrors, as shown in FIGS. 1 and 2, a part of the size contributed by the light path from a lens set to a photoelectric device cannot be reduced because the two light paths independently and separately exist in the optical device.

SUMMARY OF THE INVENTION

Therefore, an object of the present invention is to provide an optical device having reduced size by overlapping two light paths respectively from a target object to a lens set and from the lens to a photoelectric device, in which the lens are surrounded by a plurality of reflecting mirrors.

According to the present invention, an optical device for realizing image data of a target object includes a reflecting device for receiving and reflecting light from the target object to obtain an enclosed area surrounded by a reflective light track, and sending out a reflective light signal; a focusing device located within the enclosed area for receiving and focusing the reflective light signal, and sending out a focused light signal; and a processing device for receiving and processing the focused light signal in order to realize the image data of the target object.

The reflecting device can be embodied by a plurality of reflecting mirrors located around the focusing device for interactively creating the reflective light track.

In a preferred embodiment, the focusing device is a lens or a lens set, and the processing device is a charge coupled device.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
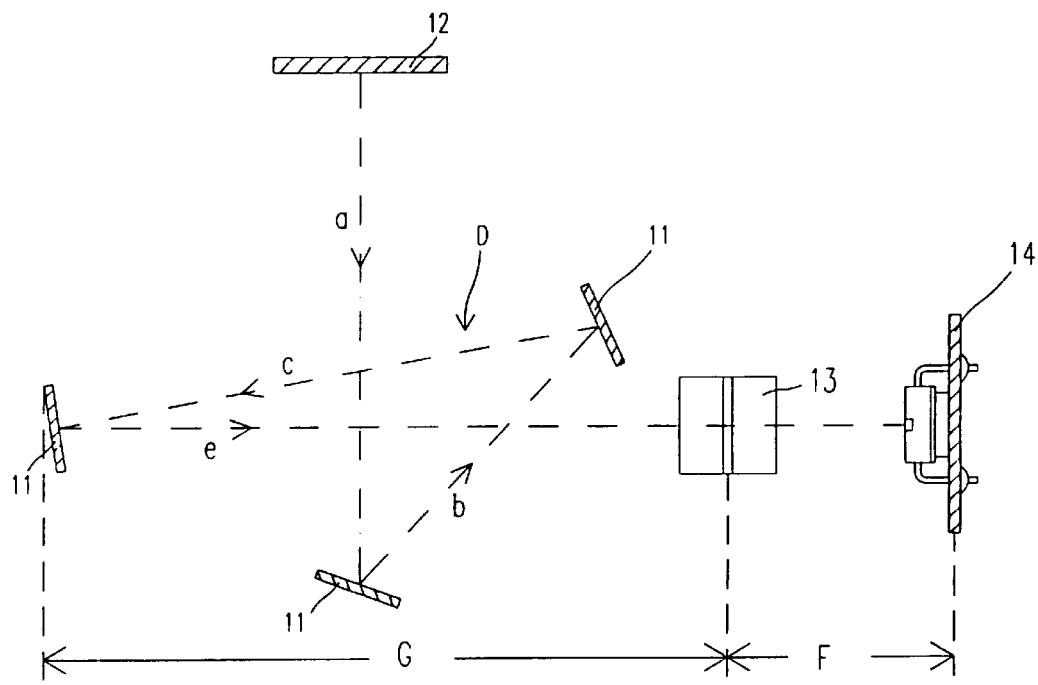
FIG. 1 is a schematic diagram showing a conventional optical device and its light path.
Figure 2:
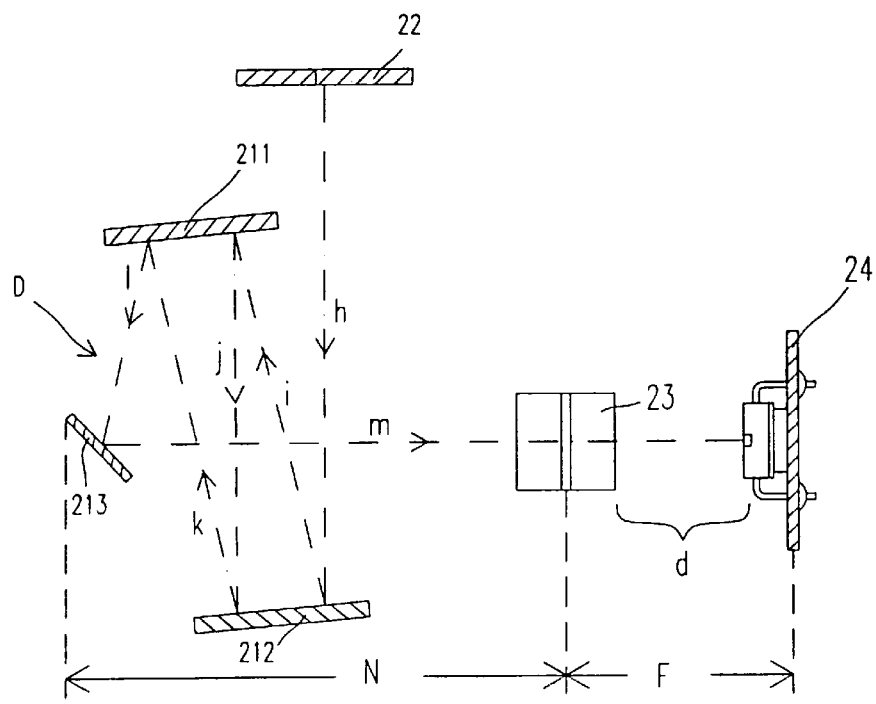
FIG. 2 is a schematic diagram showing another conventional optical device and its light path.
Figure 3:
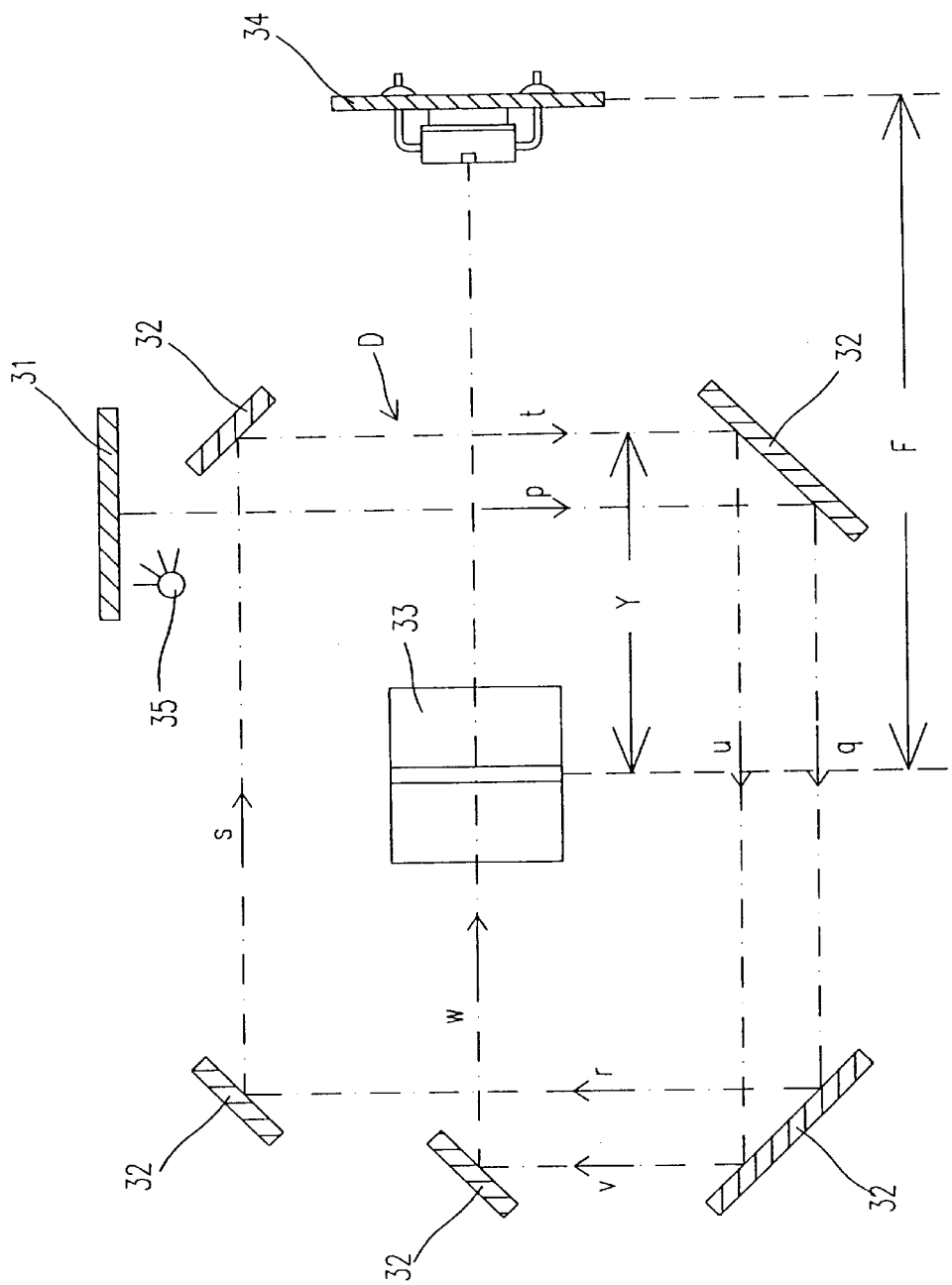
FIG. 3 is a schematic diagram showing a preferred embodiment of an optical device according to the present invention and its light path.

Please refer to FIG. 3 which is a schematic diagram showing a preferred embodiment of an optical device according to the present invention and its light path. The optical device shown in FIG. 3 includes a light source 35, a plurality of reflecting mirrors 32, a lens 33, and a charge couple device 34. When the light source 35 emits light to the target object 31, a light bearing the image information of the target object is reflected from the target object to one of the reflecting mirrors 32 via the light track segment p, then reflected among the reflecting mirrors 32 through the light track segments q, r, s, t, u, v and w, and finally reaches the lens set 33 to be focused. Under the same case as the conventional optical device as shown in FIGS. 1 and 2, the distance of p+q+r+s+t+u+v+w is also equal to D (referring to the description in BACKGROUND OF THE INVENTION), and the distance between the lens set 33 and the charge coupled device 34 is also equal to F.

It is to be noted that the track of the light reflected among the reflecting mirrors surrounds the lens set 33, as shown in FIG. 3, and the light path between the lens set 33 and the charge couple device 34 is overlapped with the reflected light path by a distance of Y. Therefore, the size of the optical device according to the present invention is reduced by about the distance Y, compared to the optical device having a lens set thereof outside the reflecting light path. Of course, the multiple reflections of the reflecting mirrors allows the distances between every two mirrors to be further reduced. Such a design will be particularly advantageous for an optical device having high resolution (600 dpi or above)

because the distance between the lens and the charge coupled device is required even longer.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical device for realizing image data of a target object, comprising:

a reflecting device for receiving and reflecting light from said target object to obtain an enclosed area surrounded by a reflective light track, and sending out a reflective light signal;

a focusing device located within said enclosed area for receiving and focusing said reflective light signal, and sending out a focused light signal; and a processing device for receiving and processing said focused light signal in order to realize said image data of said target object.

2. The optical device according to claim 1 wherein said reflecting device includes a plurality of reflecting mirrors located around said focusing device for interactively creating said reflective light track.

3. The optical device according to claim 1 wherein said focusing device is a lens.

4. The optical device according to claim 1 wherein said focusing device is a lens set.

5. The optical device according to claim 1 wherein said processing device is a charge coupled device.

* * * * *